(12) United States Patent
Madou et al.

(10) Patent No.: US 9,558,355 B2
(45) Date of Patent: Jan. 31, 2017

(54) SECURITY SCAN BASED ON DYNAMIC TAINT

(75) Inventors: Matias Madou, Lichtervelde (BE); Sam Ng Ming Sum, Hong Kong (HK)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 14/424,401

(22) PCT Filed: Aug. 29, 2012

(86) PCT No.: PCT/US2012/052772
§ 371 (c)(1),
(2), (4) Date: Feb. 26, 2015

(87) PCT Pub. No.: WO2014/035386
PCT Pub. Date: Mar. 6, 2014

(65) Prior Publication Data
US 2015/0248559 A1    Sep. 3, 2015

(51) Int. Cl.
*G06F 21/00* (2013.01)
*G06F 21/57* (2013.01)
*H04L 29/06* (2006.01)
*G06F 17/30* (2006.01)

(52) U.S. Cl.
CPC ....... *G06F 21/577* (2013.01); *G06F 17/30386* (2013.01); *H04L 63/1433* (2013.01); *G06F 2221/033* (2013.01); *G06F 2221/034* (2013.01)

(58) Field of Classification Search
USPC ...................................................... 726/25
See application file for complete search history.

(56) References Cited

U.S. PATENT DOCUMENTS

| | | |
|---|---|---|
| 2005/0273859 A1 | 12/2005 | Chess et al. |
| 2007/0240225 A1 | 10/2007 | Shrader et al. |
| 2008/0184208 A1 | 7/2008 | Sreedhar et al. |
| 2009/0172644 A1 | 7/2009 | Nagarajan |
| 2009/0205047 A1 | 8/2009 | Podjarny |
| 2009/0282480 A1 | 11/2009 | Lee et al. |
| 2010/0169974 A1 | 7/2010 | Calendino et al. |

(Continued)

FOREIGN PATENT DOCUMENTS

| | | |
|---|---|---|
| CN | 102081719 A | 6/2011 |
| JP | 2006-518080 | 8/2006 |

(Continued)

OTHER PUBLICATIONS

Newsome et al; "Dynamic Taint Analysis for Automatic Detection, Analysis, and Signature Generation of Exploits on Commodity Software";2005, 18 pages.*
International Searching Authority, Appl. No. PCT/US2012/052772, Search Report and Written Opinion, 8pp, Aug. 29, 2012.
Monga, et al., "A Hybrid Analysis Framework for Detecting Web Application Vulnerabilities", < http://ieeexplore.ieee.org/stamp/stamp.jsp?arnumber=5068455 > On pp. 25-32, May 19, 2009.

(Continued)

*Primary Examiner* — Jason Lee
(74) *Attorney, Agent, or Firm* — Hewlett Packard Enterprise Patent Department

(57) ABSTRACT

Example embodiments disclosed herein relate to generating a scanning strategy based on a dynamic taint module. A dynamic taint module associated with an application is caused to be initiated for a crawling phase of a security test. A report is received from the dynamic taint module. The dynamic taint module is restricted. The scanning strategy is based on the report.

16 Claims, 5 Drawing Sheets

(56) References Cited

U.S. PATENT DOCUMENTS

| | | | |
|---|---|---|---|
| 2010/0293616 A1* | 11/2010 | Young | G06F 21/564 |
| | | | 726/25 |
| 2011/0087892 A1 | 4/2011 | Haviv et al. | |
| 2011/0173693 A1 | 7/2011 | Wysopal et al. | |
| 2011/0252475 A1* | 10/2011 | Mui et al. | G06F 21/56 |
| | | | 726/23 |
| 2012/0072968 A1 | 3/2012 | Wysopal | |
| 2012/0110551 A1 | 5/2012 | Fink et al. | |
| 2013/0312102 A1* | 11/2013 | Brake | H04L 63/1433 |
| | | | 726/25 |

FOREIGN PATENT DOCUMENTS

| | | |
|---|---|---|
| JP | 2006-526221 | 11/2006 |
| JP | 2008-135029 | 6/2008 |
| JP | 2010-176658 | 8/2010 |

OTHER PUBLICATIONS

Newsome, et al., "Dynamic Taint Analysis for Automatic Detection, Analysis, and Signature Generation of Exploits on Commodity Software", < http://repository.cmu.edu/cgi/viewcontent.cgi?article=1042&,context=ece >, Jan. 1, 2005.

Vogt, P. et al., "Cross-site Scripting Prevention with Dynamic Data Tainting and Static Analysis", < http://www.isoc.org/isoc/conferences/ndss/07/papers/cross-site-scripting_prevention.pdf >, 2007.

Petukhov et al; Detecting Security Vulnerabilities in Web Applications Using Dynamic Analysis with Penetration Testing; Computing Systems Lab, Department of Computer Science, Moscow State University; May 19-22, 2008.

Ory Segal, IBM Rational Application Security Insider—Through the Looking-Glass, IBM, Jan. 29, 2012, 5 pages.

Supplemental European Search Report, European Patent Application No. 12883502.2, Feb. 16, 2016, 11 pages.

* cited by examiner

SECURITY SCAN BASED ON DYNAMIC TAINT

BACKGROUND

Software security testing is used to identify vulnerabilities in an application such as a Web application. Traditional black-box security testing for Web-based software works by using a security testing application, often referred to as a scanner, which poses as an attacker. In a black-box approach, the scanner explores an Application Under Test (AUT) by making HyperText Transfer Protocol (HTTP) requests and evaluating the HTTP responses or the lack thereof in order to find all of the URLs where the AUT accepts input. The URLs where the AUT accepts input may be referred to the attack surface of the AUT. The scanner then creates attacks based on the attack surface and likely categories of vulnerabilities. The scanner applies the attacks to diagnose the presence or absence of vulnerabilities by evaluating the program's HTTP responses. In a black-box approach, the scanner does not have any insight into the internal workings of the AUT.

BRIEF DESCRIPTION OF THE DRAWINGS

The following detailed description references the drawings, wherein.

DETAILED DESCRIPTION

Embodiments described herein provide techniques for performing testing of applications, such as web applications. When a company desires to know how secure a web application the company has in production is or going to be put into production, the company often uses a security testing solution such as a penetration testing solution (e.g., use of a scanner). The company may wish to use a copy of the application in production as an Application Under Test (AUT). Using an AUT that is going to be the application in production at a quality assurance stage ensures that the application used in production has been tested.

Web application security scanners are an approach for finding security vulnerabilities in applications, such as web applications. In some scenarios, a crawler first determines an attack surface manually or automatically. The attack surface can be large for some applications.

The scanner then goes through the attack surface list and for each entry in the attack surface list, an extensive number of attacks can be performed to determine whether a vulnerability can occur. It is challenging to determine the vulnerability from the attack surface because the scanner may have limited visibility to the code executed in the application. Because of the limited visibility, a set of attacks are performed on each attack surface entry. Further, in certain scenarios, few of the attacks that are performed find a vulnerability. As such, many attacks are performed and only a few of the attacks are successful. This leads to scanner testing to be time consuming. On large websites, scanning can take hours or even days to complete. Users and customers may desire quicker scanning time.

Additional insight information about the application may help the scanner in making more intelligent decisions about what attacks should be performed, and which attacks are not worth considering. Reducing the number of attacks directly improves the scan time.

Accordingly, an approach is provided to speed up the scanning process by using a dynamic taint analysis to report possible vulnerability categories to the scanner. Then the scanner can selectively scan the application based on the vulnerability categories determined by the dynamic taint analysis. Thus, the number of tests to be conducted can be reduced by limiting the scan on attack surfaces to particular vulnerabilities determined based on the dynamic taint analysis. As such, overall scanning can be faster than without the use of information from the dynamic taint analysis.

Figure 1:
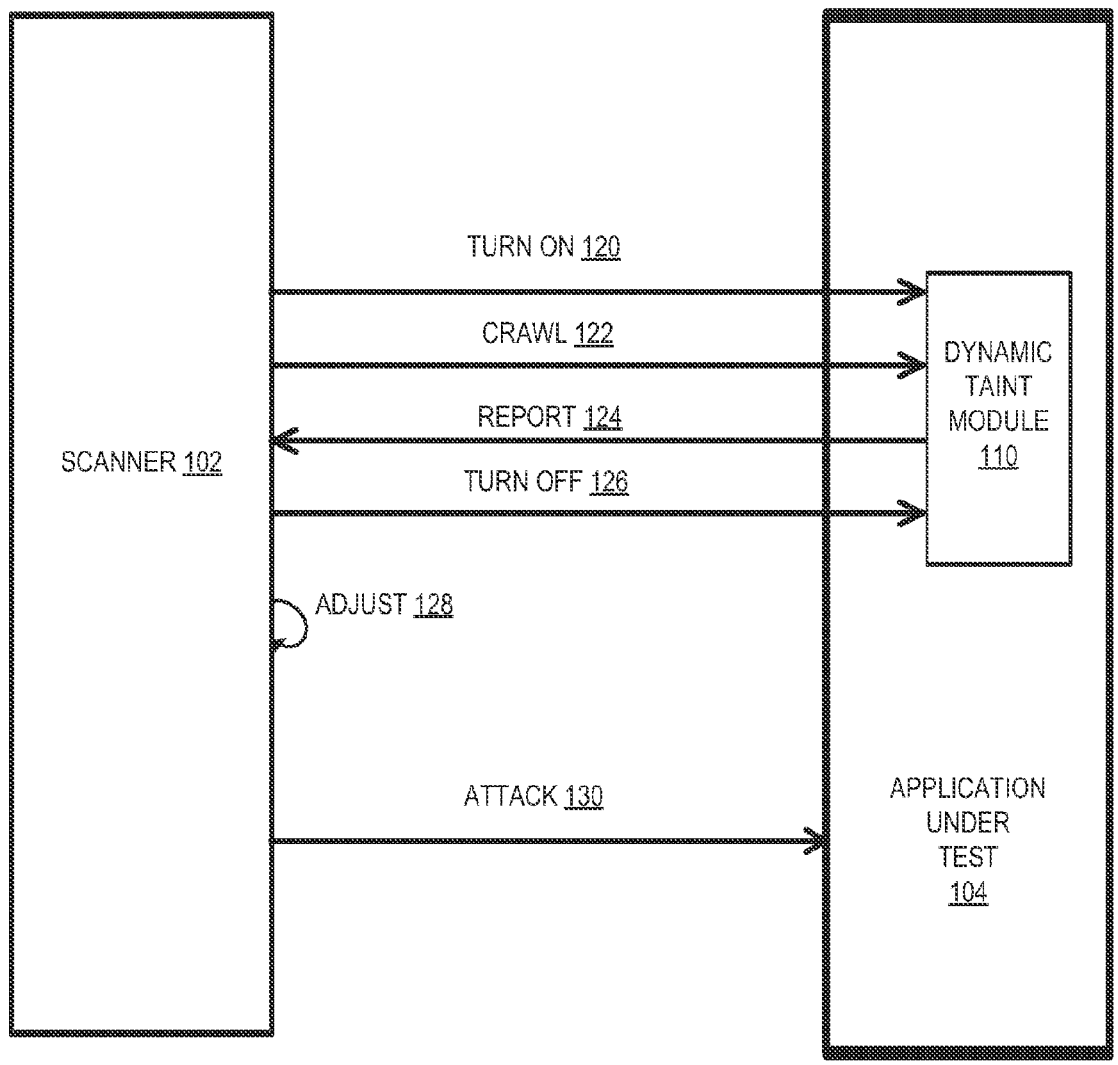
FIG. 1 is a block diagram of a system capable of performing a security attack based on a vulnerability list from a dynamic taint module, according to one example.

FIG. 1 is a block diagram of a system capable of performing a security attack based on a vulnerability list from a dynamic taint module, according to one example. The system 100 can include an application security scanner 102 and an application under test (AUT) 104. The AUT 104 can be implemented on one or more computing devices such as servers (e.g., a Java 2 Platform, Enterprise Edition (J2EE) application server, an Internet information server, or the like). Further, the AUT 104 can include a dynamic taint module 110.

The AUT 104 may be encoded in any suitable Web-based computer language, such as JAVA, or .NET, among others. The AUT 104 may operate within an suitable software framework, such as Struts, Struts 2, ASP.NET MVC, Oracle WebLogic, and Spring MVC, among others. The software framework includes a set of common code modules that provide generic functionality, which can be selectively overridden or specialized by user code to providing specific functionality. The AUT 104 may be configured to execute one or more instances of a Java Virtual Machine (JVM), Common Language Runtime (CLR), and/or other runtime environment for processing requests from the scanner 102. The programming instructions provided by the common code modules of the software framework or runtime environment may be referred to as container code. The custom programming instructions specific to the AUT 104 may be referred to as user code.

The scanner 102 can be considered a program that is executable by a computing device that communicates with an AUT 104 through a front-end such as a web interface in order to identify potential security vulnerabilities of the AUT 104 and architectural weaknesses, for example, by performing black-box testing.

The AUT 104 includes a network interface (not shown) for enabling communications between the scanner 102 and the AUT 104 through the network. The network interface exposes the attack surface of the AUT 104 and is the same interface that would eventually be used to provide access to the AUT 104 when the AUT 104 is made available for general use. Communication between the scanner 102 and the AUT 104 over the network interface may be conducted through application (e.g., via HTTP) requests issued from the scanner 102 to the AUT 104 and HTTP responses issued from the AUT 104 to the scanner 102. Requests targeting the AUT 104 may be referred to as application requests, and responses received from the AUT 104 may be referred to as application responses. The application requests generated by the scanner 102 may be configured to expose potential vulnerabilities of the AUT 104, to respond to tests posed by the AUT 104, or the like.

Networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc.

In one approach for conducting a security test of the AUT 104, the scanner 102 can receive information from a dynamic taint module 110 during a crawling phase of the security test. In one example, a dynamic taint module 110 is a special runtime module to monitor security vulnerabilities during program execution of the AUT 104. The dynamic taint module 110 works like a program debugger, it intercepts program execution at predefined program points (e.g., similar to breakpoints in a debugger) and perform security checking. Dynamic taint analysis finds security vulnerabilities by first marking entrusted user inputs as possible taint sources and then traces the user inputs to determine whether any of the data from the user inputs can be used in any dangerous function calls. Examples of dangerous function calls include direct database queries (e.g., direct Structure Query Language (SQL) queries), file open, file delete, a write function to a HyperText Markup Language response stream, a shell command execution, a direct Extensible Markup Language (XML) query, a function to write error messages to a log file, a direct user directory query, etc. The dynamic taint module 110 can be added to the application by compiling the AUT 104 with a special library or by instrumenting or modifying the binary code of the AUT 104 directly.

During testing, the scanner 102 can send a message to turn on 120 the dynamic taint module 110. The AUT 104 receives the message and determines whether a dynamic taint module 110 is present. If there is a dynamic taint module 110 present, the scanner 102 can send a message to enable the dynamic taint module 110 and/or the AUT 104 can enable it based on the scanner's previous message.

The scanner 102 can then perform a crawling phase 122. The scanner 102 crawls the AUT 104, for example, via a website interface. Dynamic taint analysis is performed while the crawling occurs. When the scanner 102 crawls the application, the scanner 102 can access one or more entry points (e.g., input fields) one or more times. During testing, a scanner 102 can explore the AUT 104 by making HTTP requests and evaluating the HTTP responses or the lack thereof in order to find the URLs where the AUT 104 accepts input. In some examples, the scanner 102 may obtain an attack surface of the AUT 104 via a pre-recorded web process flow provided by an end-user or by using another runtime module installed in the AUT 104 to auto-discover the attack surface. Accessing the respective entry points can trigger the dynamic taint analysis.

The dynamic taint module 110 can provide a report 124 to the scanner 102 in response to the crawling phase 122, for example, at the end of the crawling phase 122. The report can include a list of vulnerability candidates detected during the crawling phase 122.

In some examples, the crawling and the reporting 124 can be performed iteratively or incrementally. For example, a report can be received for a portion of the crawling phase 122. As such, the report can be broken up into pieces, for example, in a web application, a report can be sent for each page crawled of a website. Further, in other examples, a report can be sent at the end of the crawling phase of the entire website.

The scanner 102 can then send a message to turn off 126 or disable the dynamic taint module 110 of the AUT 104. In some examples, the dynamic taint module 110 is partially disabled instead of completely disabled. For example, the scanner 102 can cause the dynamic taint module 110 to disable each of the taint sources other than a taint source for an attack vector that the scanner 102 wishes to collect data upon. Disabling the dynamic taint module 110 allows the scanner 102 to attack the AUT 104 without the additional code of the dynamic taint module 110 executing. Further, because the additional code is not executing, the time to complete the test can be reduced.

At 128, the scanner 102 adjusts and/or generates a scanning strategy for the AUT 104 according to the information obtained from the report. This can be based on a scan policy. In one example, the scanner 102 creates a strategy to launch attacks related to the possible vulnerabilities pre-screened by the dynamic taint module 110. As such, the overall duration of the test can be shortened because other tests are filtered out. In another example, a list of vulnerability candidates in the report 124 can be provided a higher priority in the attack strategy so that more probable vulnerabilities can be found earlier in the attack. In certain examples, the adjustment 128 can occur dynamically or incrementally, for example, while receiving partial reports.

At 130, the scanner 102 attacks the AUT 104 according to the attack strategy. As noted, the attack strategy can correlate to or be prioritized based on a list of vulnerabilities in the report. As such, useless or impossible attacks can be filtered from the attack 130, thus reducing the amount of time the overall security scan takes.

Figure 2B:
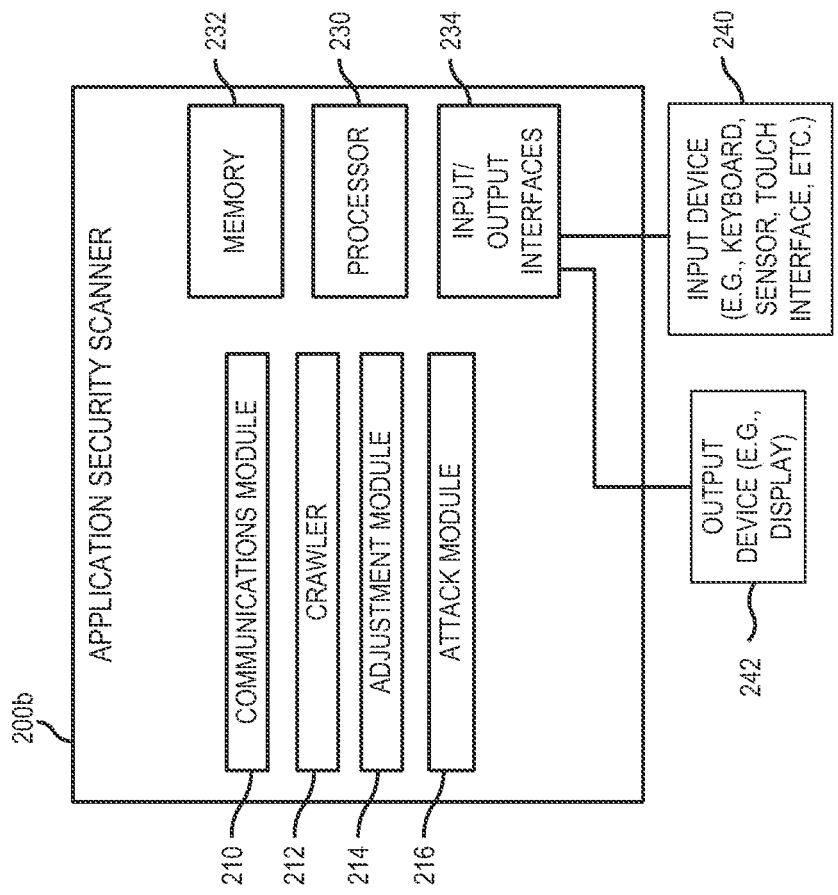
FIGS. 2A and 2B are block diagrams of application security scanners capable of attacking an application based on a vulnerability list generated by a dynamic taint module, according to various examples.
Figure 2A:
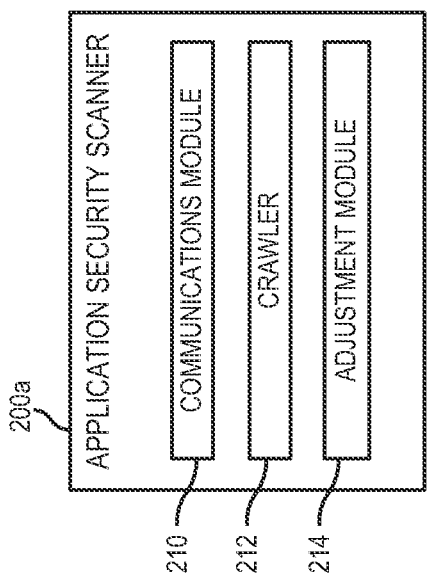

FIGS. 2A and 2B are block diagrams of application security scanners capable of attacking an application based on a vulnerability list generated by a dynamic taint module, according to various examples. Application security scanners 200a, 200b include components that can be utilized to attack an application based on a vulnerability list generated by the dynamic taint module. The respective scanners 200a, 200b may be a notebook computer, a desktop computer, a server, a workstation, or any other computing device that is capable of accessing an application under test and can execute a test. In one example, application security scanner 200a, can include a communications module 210, a crawler 212, and an adjustment module 214. In another example, application security scanner 200b further includes an attack module 216, a processor 230, memory 232, and/or input/output interfaces 234 that can use input devices 240 and/or output devices 242.

The communications module 210 can be used to communicate with other devices, for example, a device including an application under test. The application under test can also include a dynamic taint module. In certain examples, the communications module 210 can be configured to communicate with the dynamic taint module specifically. In some examples, the communications module 210 can communicate via a network interface, for example, a wireless network interface, a wired network interlace, via the Internet, via an intranet, via a direct connection to a server hosting the application under test, or the like. In certain examples, the communications module 210 can connect to other devices in a network.

The application security scanner 200 can send a message via the communications module 210 to an application under test to turn on a dynamic taint module of the AUT. As such, the application security scanner 200 can cause a dynamic taint module associated with the AUT to initiate the dynamic taint module for a crawling phase of a security test. In one example, initiating the dynamic taint module means to activate a functionality of the dynamic taint module to assist the application security scanner 200. The security test can be coordinated via the application security scanner 200.

A crawler 212 can be used to access the AUT. In one example, the crawler can obtain attack entry points of the AUT during the crawling phase. As detailed further below, the dynamic taint module can turn on and generate a report or multiple reports providing information about possible security vulnerabilities. For example, the report can include a vulnerability candidate list of one or more possible vulnerabilities of the AUT determined by the dynamic taint module during the crawling phase.

Then, the application security scanner 200 can cause restriction of the dynamic taint module. In one example, causing restriction of the dynamic taint module can mean to disable the functionality enabled. In some examples part of the functionality can be disabled. In certain examples, the crawling phase can begin when the dynamic taint module is initiated and end when the dynamic taint module is restricted. In other examples, the crawling phase can last as long as the application security scanner 200 looks for additional entry points.

The adjustment module 214 can generate a scanning strategy based on the report. In one example, generation of the scanning strategy can include modifying another scanning strategy for the AUT based on the vulnerability candidate list. For example, the scanning strategy can be determined by prioritizing the vulnerability candidate list in an attack conducted by an attack module 216. The deprioritized attacks can be remainders from the other scanning strategy. In another example, the adjustment module 214 can determine the scanning strategy by determining attacks focused on the vulnerability candidate list. For example, the attacks can be determined for each attack entry point based on accessible possible vulnerabilities noted by the dynamic taint module for the respective entry points. As such, attacks on the attack entry point can be filtered based on the vulnerability candidates determined by the dynamic taint module.

The attack module 216 can perform the attack on the AUT based on the attack strategy. In some examples, the attack module 216 uses one or more communications modules 210 to implement the attack.

In one example, the dynamic taint module and/or the AUT can receive a message from the application security scanner 200. The dynamic taint module can be initiated in response to the message. Further, the dynamic taint module can generate a report during the crawling phase. The report can include a list of vulnerability candidates determined via dynamic taint analysis. The report can be sent to the application security scanner 200. The application security scanner 200 can receive the report and send a second message to disable at least part of the dynamic taint module. The dynamic taint module can receive the second message and disable the dynamic taint module and/or disable a part of the dynamic taint module. Disabling a part of the dynamic taint module may include, for example, enabling dynamic taint analysis that may be related to particular attack vectors to be used by the application security scanner 200 while limiting or disabling portions that are unrelated to the attack vector. As the attack vector changes, messages can be sent and received to disable other portions of the dynamic taint module.

As discussed above, the dynamic taint module intercepts program execution of the AUT during the crawling phase to determine security vulnerability candidates by marking untrusted one or more user inputs as taint sources. A trace is performed on the user inputs to determine whether the respective user inputs lead to a dangerous function call. As noted above, a dangerous function call can include at least one of a direct database query, a file open, a file delete, and a write function to a HyperText Markup Language response stream. Further, examples of vulnerabilities include a SQL injection (e.g. a direct database query), Path Manipulation (e.g., a file open, a file delete, etc.), Cross-site Scripting (e.g., a write function to a HTML response stream), a command injection (e.g., a shell command execution), an XPath Injection (e.g., a direct XML query), Log Forging (e.g., a function to write error messages to a log file), and Lightweight Directory Access Protocol (LDAP) Injection (e.g., a direct user directory query).

A processor 230, such as a central processing unit (CPU) or a microprocessor suitable for retrieval and execution of instructions and/or electronic circuits can be configured to perform the functionality of any of the modules 210, 214, 216, or crawler described herein. In certain scenarios, instructions and/or other information, such as the scanning strategy, report, or vulnerability candidate list, can be included in memory 232 or other memory. Input/output interfaces 234 may additionally be provided by the application security scanner 200b. For example, input devices 240, such as a keyboard, a sensor, a touch interface, a mouse, a microphone, etc. can be utilized to receive input from an environment surrounding the application security scanner 200b. Further, an output device 142, such as a display, can be utilized to present information to users. Examples of output devices include speakers, display devices, amplifiers, etc. Moreover, in certain embodiments, some components can be utilized to implement functionality of other components described herein.

Each of the modules 210, 214, 216, and/or crawler 212 may include, for example, hardware devices including electronic circuitry for implementing the functionality described herein. In addition or as an alternative, each module 210, 214, 216, and/or crawler 212 may be implemented as a series of instructions encoded on a machine-readable storage medium of computing device and executable by processor 230. It should be noted that, in some embodiments, some modules are implemented as hardware devices, while other modules are implemented as executable instructions.

Figure 3:
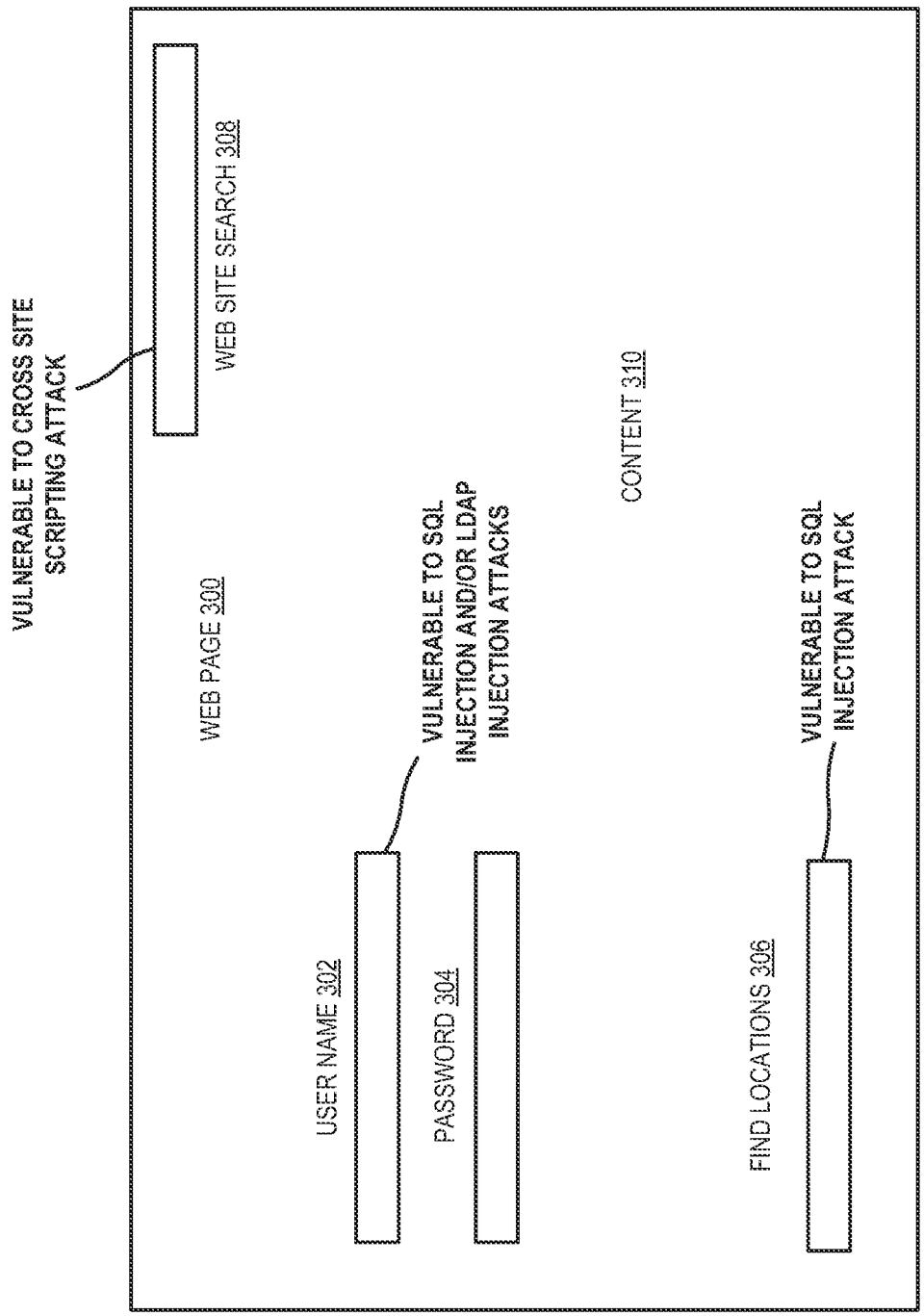
FIG. 3 is a diagram of a web application interface of an application under test, according to one example.

FIG. 3 is a diagram of a web application interface of an application under test, according to one example. This example diagram shows a web page 300 that can be provided as an interface to the scanner by the AUT. The scanner, during a crawling phase can determine entry points that take user input from the page. During the crawling phase, the dynamic taint module can determine pre-screened vulnerabilities for each input field of a given page of the AUT. The dynamic taint module can, for example, determine the vulnerability candidate list of Table 1 based on the available fields on the web page 300.

TABLE 1

Example Vulnerability Candidate List

| Page | Field Name | Pre-Screened Vulnerability Candidates |
|---|---|---|
| Search.jsp | Search | Cross-site scripting |
| Login.jsp | Username | SQL Injection, LDAP Injection |
| Location.jsp | ATM_location | SQL Injection |

The web page 300 can include fields for user name 302, password 304, find locations 306, web site search 308 as well as additional content 310. User name 302 and password 304 can be used for a type of login, find locations 306 may be used to find locations of items or services such as ATM locations, and the web site search 308 can be used to search the web pages of the application. In one example, the vulnerabilities are determined by the dynamic taint module by marking as tainted untrusted user inputs to the fields and then tracing the functions that can be called. In this example, the user name 302 field can be vulnerable to SQL injection and/or LDAP injection attacks. The find locations 306 field can be associated with a vulnerability to SQL injection attacks, while the web site search 308 is vulnerable to cross-site scripting attacks. The dynamic taint module can create a report including the vulnerability candidate list and send it to the scanner. The scanner can then attack the application based on the information provided, for example, using filtering and/or prioritizing attacks based on the vulnerability candidate list.

Figure 4:
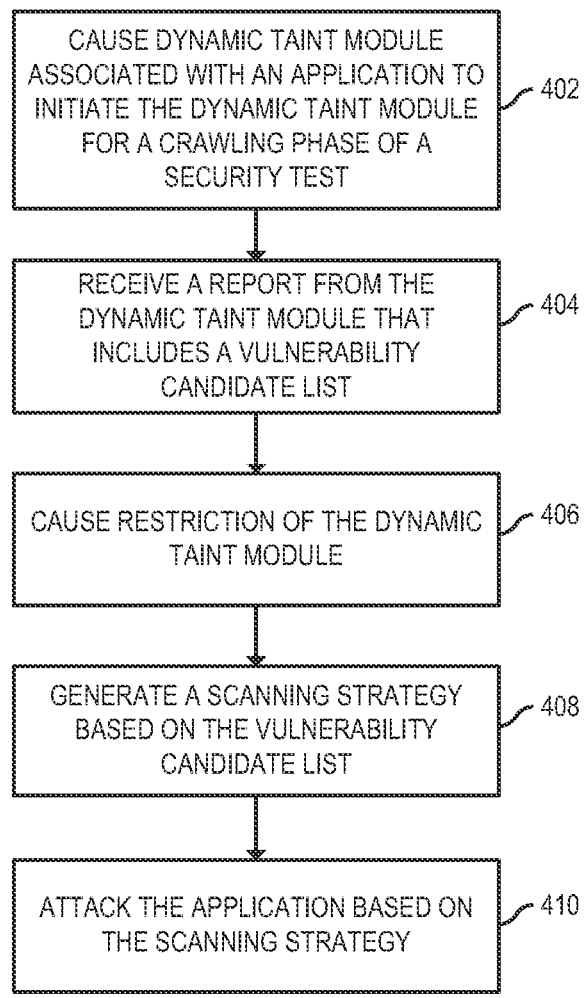
FIG. 4 is a flowchart of a method for attacking an application based on a scanning strategy based on a vulnerability list generated by a dynamic taint module, according to one example.

FIG. 4 is a flowchart of a method for attacking an application based on a scanning strategy based on a vulnerability list generated by a dynamic taint module, according to one example. Method 400 can be implemented using suitable components, for example, scanner 102, application security scanner 200, or computing device 500. Additionally, the components for executing the method 400 may be spread among multiple devices. Method 400 may be implemented in the form of executable instructions stored on a machine-readable storage medium, such as storage medium 520, and/or in the form of electronic circuitry.

At 402, the scanner causes a dynamic taint module associated with an application under test to initiate for a crawling phase of a security test. The application can cause the initialization of the dynamic taint module. Initialization can include determining whether the dynamic taint module is included in the application and turning on one or more features of the dynamic taint module. Further, initialization can include setting up one or more variables or settings to predetermined values. The scanner can cause crawling of the application. During the crawling phase, the dynamic taint module performs analysis on inputs found by the scanner. As noted above, the analysis can yield a report including a list of vulnerability candidate list. The application and/or dynamic taint module can send the report to the scanner.

At 404, the scanner receives the report from the dynamic taint module and/or application. The report can include a vulnerability candidate list. Then, at 406, the scanner causes restriction of the dynamic taint module. In one example, the restriction is caused by sending a message to the application and/or dynamic taint module.

At 408, the scanner can generate a scanning strategy based on the vulnerability candidate list of the report. The scanning strategy may also be based on another scanning strategy, for example, a premade, default, or dynamically created scanning strategy. In one example, the scanning strategy includes prioritizing the vulnerability candidate list for attacks on the application. In another example, the attack strategy can consist of attacks related to the vulnerabilities on the vulnerability candidate list. In other examples, the attack strategy can include the attacks related to the vulnerabilities. At 410, the scanner can implement the attack strategy on the application under test.

With the above approaches, scan time of an application can be reduced without losing security vulnerability findings. Further, in certain scenarios, integrating the dynamic taint module with the application security scanner may help the scanner find security vulnerabilities that cannot be detected by the scanner alone or may be difficult to detect by the scanner alone, such as Persistent Cross-Site Scripting (PXSS) or Blind SQL Injection. In some examples, the vulnerability candidates can be listed as vulnerabilities. For example, instead of reporting certain vulnerabilities as vulnerability candidates, the dynamic taint module can directly mark a PXSS or Blind SQL Injection reported by the dynamic taint module as a vulnerability. Moreover, the scanner can read such vulnerabilities that are on the vulnerability candidate list as vulnerabilities.

Figure 5:
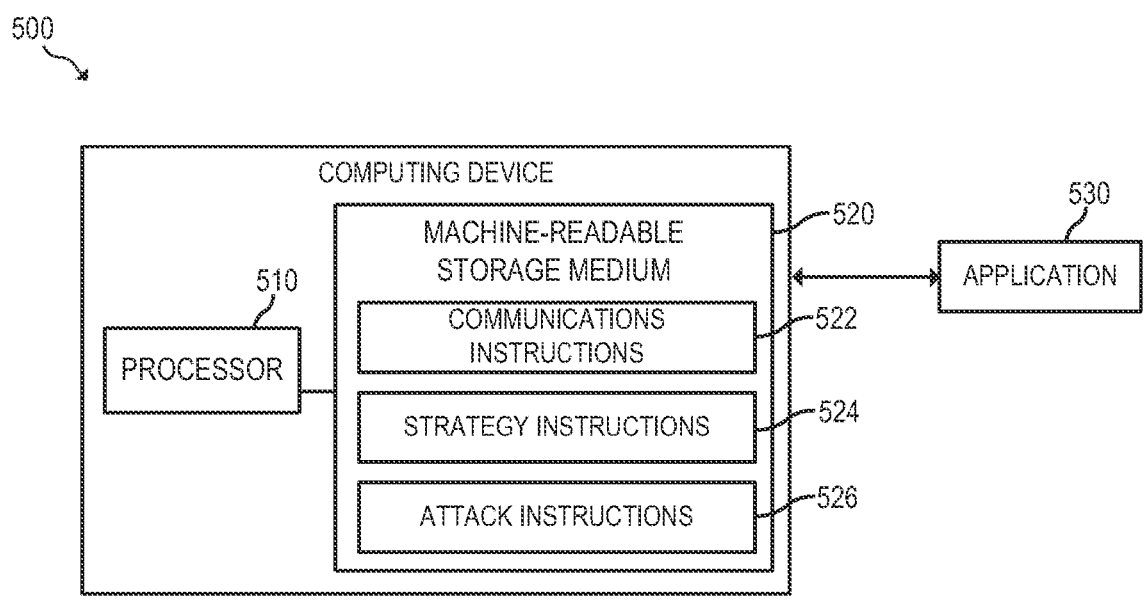
FIG. 5 is a block diagram of computing device capable of generating an attack on a web application based on a vulnerability list, according to one example.

FIG. 5 is a block diagram of computing device capable of generating an attack on a web application based on a vulnerability list, according to one example. The computing device 500 includes, for example, a processor 510, and a machine-readable storage medium 520 including instructions 522, 524, 526 for generating an attack on a web application based on a vulnerability candidate list. Computing device 500 may be, for example, a notebook computer, a server, a workstation, a desktop computer, or any other computing device.

Processor 510 may be, at least one central processing unit (CPU), at least one semiconductor-based microprocessor, at least one graphics processing unit (GPU), other hardware devices suitable for retrieval and execution of instructions stored in machine-readable storage medium 520, or combinations thereof. For example, the processor 510 may include multiple cores on a chip, include multiple cores across multiple chips, multiple cores across multiple devices (e.g., if the computing device 500 includes multiple node devices), or combinations thereof. Processor 510 may fetch, decode, and execute instructions 522, 524, 526 to implement method 400. As an alternative or in addition to retrieving and executing instructions, processor 510 may include at least one integrated circuit (IC), other control logic, other electronic circuits, or combinations thereof that include a number of electronic components for performing the functionality of instructions 522, 524, 526.

Machine-readable storage medium 520 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 520 may be encoded with a series of executable instructions for implementing method 400. In certain examples, another computing device can be used to implement an application under test.

Communications instructions 522 can be used to control communications hardware to send a message to cause a dynamic taint module associated with an application 530 to initiate for a crawling phase of a security test. As noted above, the dynamic taint module can generate a list of vulnerability candidates that may be used to generate an attack strategy for a scan. During the crawling phase, the computing device can obtain attack entry points of the application.

The communications instructions 522 can also be executed to receive a report from the dynamic taint module. The report can include the vulnerability candidate list. As noted above, the vulnerability candidate list can include potential vulnerabilities of the attack entry points determined by marking untrusted one or more user inputs as taint sources and tracing the user inputs to determine whether the respective user inputs lead to a dangerous function call. Dangerous function calls can be determined based on an analysis of code and/or based on a predetermined list.

The computing device 500 then generates a message to cause restriction of the dynamic taint module. The message can be sent to the application 530 to turn off the dynamic taint module. As noted above, the restriction can speed up the security test by limiting execution needed by the application 530 and/or the computing device executing the application 530.

Strategy instructions 524 can be executed to generate a scanning strategy based on the vulnerability candidate list. As noted above, in one example, the scanning strategy can prioritize attacks directed towards the vulnerability candidate list. Also, in another example, the scanning strategy can filler attacks that are not associated with the vulnerability candidate list. With both approaches, likely attacks can be executed by the computing device 500 by executing attack instructions 526 by using the respective scanning strategies. By limiting or prioritizing attacks on the application, less time can be used to obtain results of a successful attack because attacks that are not possible are not used.

What is claimed is:

1. A computing system comprising:
an application security scanner including at least one hardware processor and a machine-readable storage medium storing instructions that, when executed by the at least one hardware processor, cause the at least one hardware processor to:
cause a dynamic taint module associated with the application security scanner to initiate a crawl phase of a security test for an application under test to execute at a server separate from the scanner,
wherein the dynamic taint module is executed at the server,
wherein the dynamic taint module is to: intercept program execution of the application under test during the crawl phase to determine a plurality of security vulnerability candidates, wherein the dynamic taint module is to mark a plurality of untrusted user inputs as taint sources and trace the respective untrusted user inputs to determine whether the respective untrusted user input lead to a function call associated with vulnerability;
wherein the security test includes the crawl phase and an attack;
perform a dynamic taint analysis by the dynamic taint module as part of the crawl phase of the security test;
receive a report including the security vulnerability candidates from the dynamic taint module;
cause restriction of the dynamic taint module; and
generate a scanning strategy based on the security vulnerability candidates from the report received from the dynamic taint module to use in the attack.

2. The computing system of claim 1, further comprising:
the dynamic taint module to:
receive a first message from the application security scanner to initiate the dynamic taint module;
initiate the dynamic taint module in response to the first message;
generate the report during the crawl phase;
cause sending of the report to the application security scanner;
receive a second message to disable the dynamic taint module; and
disable at least part of the dynamic taint module based on the second message for the attack.

3. The computing system of claim 1, wherein the function call includes at least one of: a direct database query, a file open, a file delete, and a write function to a HyperText Markup Language response stream.

4. The computing system of claim 1, wherein the dynamic taint module is to initiate activation of a functionality of the dynamic taint module to assist the application security scanner, and wherein the dynamic taint module is to restrict the dynamic taint module by disabling the functionality.

5. The computing system of claim 1, wherein the application security scanner further comprising a crawler to:
obtain attack entry points of the application under test during the crawl phase, wherein the application security scanner is further to:
receive a vulnerability candidate list of the security vulnerability candidates of the application under test, wherein the vulnerability candidate list is determined by the dynamic taint module.

6. The computing system of claim 5, wherein the application security scanner further comprising:
an adjustment module to determine the scanning strategy by prioritizing the vulnerability candidate list in an attack; and
an attack module to conduct the attack on the application under test based on the scanning strategy in the attack phase.

7. The computing system of claim 5, further comprising:
an adjustment module to determine the scanning strategy by determining attacks for the respective attack entry points focused on the security vulnerability candidates associated with the respective attack entry points; and
an attack module to attack the application under test based on the scanning strategy during the attack.

8. A non-transitory machine-readable storage medium storing instructions that, when executed by at least one hardware processor of an application security scanner, cause the application security scanner to:
cause a dynamic taint module associated with the application security scanner to initiate during a crawl phase of a security test of an application under test,
wherein the security test includes the crawl phase and an attack,
wherein the dynamic taint module is located on a server that is used to execute the application under test and that is separate from the application security scanner,
wherein the dynamic taint module is to perform a dynamic taint analysis as part of the crawl phase of the security test that includes interception of program execution of the application under test during the crawl phase to determine a plurality of security vulnerability candidates by marking a plurality of untrusted inputs as taint sources and tracing the respective untrusted user inputs to determine whether the respective untrusted user inputs lead to a function call associated with vulnerability;
receive a report from the dynamic taint module that includes a vulnerability candidate list that includes the security vulnerability candidates;

cause restriction of the dynamic taint module; and
generate a scanning strategy based on the vulnerability candidate list received from the dynamic taint module to use in the attack.

9. The non-transitory machine-readable storage medium of claim 8, further comprising instructions that, when executed by the at least one hardware processor, cause the application security scanner to:
obtain attack entry points of the application under test during the crawl phase;
determine the scanning strategy by prioritizing the vulnerability candidate list to use for an attack on the application under test; and
attack the application under test based on the scanning strategy.

10. The non-transitory machine-readable storage medium of claim 8, further comprising instructions that, when executed by the at least one hardware processor, cause the application security scanner to:
obtain attack entry points of the application under test during the crawl phase;
determine the scanning strategy by determining attacks for the respective attack entry points based on the vulnerability candidate list; and
attack the application under test based on the scanning strategy.

11. The non-transitory machine-readable storage medium of claim 9, further comprising instructions that, when executed by the at least one hardware processor, cause the application security scanner to obtain the attack entry points of the application under test by performing a crawl via a website interface of the application under test during the crawl phase.

12. The non-transitory machine-readable storage medium of claim 11, wherein each of the security vulnerability candidates are associated with a particular attack entry point determined during the crawl phase.

13. A method implemented by at least one hardware processor of an application security scanner, the method comprising:
causing, by the at least one hardware processor, a dynamic taint module associated with the application security scanner, the dynamic taint module executing at a server separate from the application security scanner, to initiate during a crawl phase of a security test for an application under test also executing at the server, wherein the security test includes the crawl phase and an attack,
wherein the dynamic taint module performs a dynamic taint analysis during the crawl phase of the security test to yield a plurality of security vulnerability candidates by intercepting program execution of the application under test to determine the security vulnerability candidates by marking a plurality of untrusted user inputs of the crawling of the application under test as taint sources and tracing the respective untrusted user input to determine whether the respective untrusted user input leads to a function call associated with vulnerability;
receiving a report from the dynamic taint module that includes the vulnerability candidate list;
causing, by the at least one hardware processor, restriction of the dynamic taint module;
generating, by the at least one hardware processor, a scanning strategy based on the vulnerability candidate list received from the dynamic taint module to use in the attack; and
attacking, by the at least one hardware processor, the application under test based on the scanning strategy.

14. The method of claim 13, further comprising prioritizing the attack in the scanning strategy based on the vulnerability candidate list.

15. The method of claim 13, further comprising attacking the application under test based on the security vulnerability candidates on the vulnerability candidate list, wherein each of the security vulnerability candidates are associated with a particular attack entry point determined during the crawl phase.

16. The method of claim 13, further comprising crawling the application under test during the crawl phase, by the at least one hardware processor, via a website interface of the application under test, to determine an attack surface of the application under test.

* * * * *